United States Patent [19]

Iizuka

[11] Patent Number: 5,559,779
[45] Date of Patent: Sep. 24, 1996

[54] DIGITAL AUDIO RECORDER USING EXTERNAL MEMORY MEDIUM AND LEADING PORTION AUDIO DATA MEMORY

[75] Inventor: Nobuo Iizuka, Hamura, Japan

[73] Assignee: Casio Computer Co., Ltd., Tokyo, Japan

[21] Appl. No.: 132,445

[22] Filed: Oct. 6, 1993

Related U.S. Application Data

[63] Continuation of Ser. No. 795,983, Nov. 22, 1991, abandoned.

[30] Foreign Application Priority Data

Dec. 28, 1990 [JP] Japan ..................... 2-416544

[51] Int. Cl.⁶ .............................................. G11B 5/09
[52] U.S. Cl. ......................... 369/59; 369/48; 360/32; 360/72.2
[58] Field of Search ........................ 360/32, 39, 46, 360/49, 51, 19.1, 72.2; 369/60, 59, 47, 48, 33, 32, 341, 343; 395/425, 400; 358/342

[56] References Cited

U.S. PATENT DOCUMENTS

| | | | |
|---|---|---|---|
| 4,694,456 | 9/1987 | Morita et al. | 369/59 X |
| 4,758,907 | 7/1988 | Okamoto et al. | 360/32 X |
| 4,772,959 | 9/1988 | Amano et al. | 360/32 X |
| 4,939,595 | 7/1990 | Yoshimoto et al. | 360/32 X |
| 4,949,323 | 8/1990 | Yoshida | 369/59 X |
| 4,977,550 | 12/1990 | Furuya et al. | 369/32 |
| 5,105,412 | 4/1992 | Yoshio | 369/33 X |
| 5,146,370 | 9/1992 | Endo et al. | 360/32 |
| 5,148,419 | 9/1992 | Koguchi | 369/32 |

OTHER PUBLICATIONS

JAS Journal, Apr. 1989, pp. 16–22.

Primary Examiner—Aristotelis Psitos
Assistant Examiner—Duncan Wilkinson
Attorney, Agent, or Firm—Frishauf, Holtz, Goodman, Langer & Chick

[57] ABSTRACT

Audio data is stored as a plurality of events on a hard disk, and further header data, i.e., leading portion of the audio data is stored in a header memory prior to reproducing operation. When an event is specified, the header data is read out from the header memory at first. In the meantime, an audio data following the header data is transferred from the hard disk to a buffer memory. The contents of the buffer memory are being read out, even after the header data has been read out from the header memory. With use of an access data table is performed address control for reading out data from the header memory and the hard disk.

21 Claims, 8 Drawing Sheets

| EVENT NO. | HEADER BUFFER TOP | HEADER BUFFER END | DISK ACCESS TOP | DISK ACCESS END |
|---|---|---|---|---|
| 1 | 0 | 4FFF | a | b |
| 2 | 5000 | 9FFF | c | d |
| 3 | A000 | EFFF | e | f |
| 4 | F000 | 13FFF | g | h |

ACCESS DATA TABLE

FIG. 9

DIGITAL AUDIO RECORDER USING EXTERNAL MEMORY MEDIUM AND LEADING PORTION AUDIO DATA MEMORY

This application is a Continuation of application Ser. No. 07/795,983, filed Nov. 22, 1991, now abandoned.

BACKGROUND OF THE INVENTION

1. Field of the Invention

The present invention relates to a digital recorder which is capable of digitally recording, reproducing and/or editing an audio signal.

2. Description of the Related Art

Conventionally, as a method of recording, reproducing and editing an audio signal, a magnetic recording and reproducing technique is employed in which an analog audio signal is recorded on a magnetic tape, and the recorded signal is reproduced and edited. Since this prior art involves a recording and reproducing process for a signal in analog form, deterioration in sound quality is inevitable. In particular, the deterioration will be prominent when a once-recorded audio signal is dubbed.

Further, the use of the magnetic tape as a recording medium raises problems such that it takes much time to reach the target editing point, and edition requires that the target recorded portion of the magnetic tape be physically cut and pasted or be copied to somewhere else before the edition is executed actually.

The problem of the deterioration in sound quality can be overcome by employing a technical means that codes a signal into a digital form and records on a magnetic tape. However, there still remains a shortcoming concerning location of the starting point and the freedom of edition due to the use of a sequential-access type recording medium.

Recently, there has been proposed a solution to the conventional problems which uses a hard disk and a magneto-optical disk as a memory medium. For instance, refer to U.S. Ser. No. 07/690,710 filed on Apr. 24, 1991, inventor: Nobuo IIZUKA (the same inventor of the present invention) and U.S. Ser. No. 07/752,876 filed on Aug. 30, 1991, inventor: Tohru MIYAKE.

In reproducing audio data stored on an external memory medium such as the hard disk or the magneto-optical disk, it requires a little time to access and reproduce a given target portion stored on the external memory medium due to a delay of disk-accessing time. Therefore, an external memory device involving the hard disk or the magneto-optical disk invites another problem that it can not instantly respond to the instruction of reproduction, resulting in delayed start of the reproducing operation.

SUMMARY OF THE INVENTION

The present invention has been made to solve these problems, and has an object to provide a digital recorder which is capable of instantly reproducing audio data stored on an external memory medium such as the hard disk and the magneto-optical disk.

It is another object of the present invention to provide a digital recorder in which a plurality of audio data are stored on an external memory medium, and desired audio data is instantly selected and reproduced from among the stored audio data.

According to one aspect of the present invention, there is provided a digital recorder which comprises:

external memory medium means for storing digital audio data;

header memory means for storing prior to a reproducing operation a header which is data involved in the leading portion of the digital audio data stored on the external memory medium means;

audio data memory means for temporarily storing digital audio data following the header, the digital audio data successively supplied from the external memory medium means; and control means for reading and outputting the header stored in the header memory means in response to a command for reproduction of the digital audio data, and then reading and outputting the digital audio data which have been successively and temporarily stored in the audio data memory means.

According to one preferred embodiment of the present invention, as the above external memory medium means a disk memory medium of a random access type such as the hard disk and the magneto-optical disk may be employed.

When such disk memory medium is employed as the external memory medium, an appropriate amount of digital audio data enough for absorbing an over head time may previously be stored in the header memory means so that the audio data can be audibly output without a delay due to time for accessing data at designated locations on the disk.

With use of the above external memory medium means in which a plurality of digital audio data are previously stored, it may be possible to select and reproduce one of the stored digital audio data by a key-input operation. With such structure, in the header memory means are stored a plurality of headers, i.e., audio data which are involved in the plurality of digital audio data at their leading portions respectively. Further, the present invention may be applicable to a digital recorder of a multiple track type. More specifically, such digital recorder comprises:

audio input/output means for executing an audio signal input/output operation in association with multiple tracks;

buffer means capable of exchanging digital audio data for each track with the audio input/output means and temporarily storing the digital audio data in association with the tracks;

external memory means of a random access type capable of exchanging the digital audio data with the buffer means and having a memory area which stores data for multiple tracks and is accessible for a read/write operation of the digital audio data;

header memory means for storing prior to a reproducing operation a header which is data involved in a leading portion of the digital audio data stored in the external memory means;

data transfer means for executing transfer of digital audio data for each track between the audio input/output means and the buffer means and executing transfer of digital audio data for each track between the audio input/output means and the header memory means in a time sharing manner while scheduling in accordance with a predetermined order of priority; and control means for controlling the data transfer means in response to a command for reproduction of the digital audio data such that the headers stored in the header memory means are read out and transferred to the audio input/output means, and the digital audio data following the headers are successively transferred from the external memory means to the buffer means to be stored thereon, and then the digital audio data stored on the buffer means are further transferred to the audio input/output means.

Furthermore, there is provided a digital recorder which comprises:

a plurality of audio input/output means for selectively executing analog/digital conversion (hereafter referred to as A/D conversion) and digital/analog conversion (hereafter referred to as D/A conversion) in association with multiple tracks;

a plurality of buffer means capable of exchanging digital audio data with the plurality of audio input/output means respectively and temporarily storing the digital audio data for each track;

external memory means of a random access type capable of exchanging the digital audio data with the plurality of buffer means and having a memory area which stores data for multiple tracks, and is accessible for a read/write operation of the digital audio data;

header memory means for storing prior to a reproducing operation a header which is data involved in a leading portion of the digital audio data stored on the external memory means;

data transfer means for executing transfer of the digital audio data between the plurality of audio input/output means and the plurality of buffer means, executing transfer of the digital audio data between the plurality of audio input/output means and the header memory means, and executing transfer of the digital audio data between the plurality of buffer means and the external memory means in a time sharing manner while scheduling in accordance with a predetermined order of priority; and control means for controlling the data transfer means in response to a command for reproduction of the digital audio data such that the header stored in the header memory means is read out and transferred to an audio input/output means selected from among the plurality of audio input/output means, and the digital audio data following each header is successively transferred from the external memory means to one of the buffer means to be stored thereon, which buffer means is selected from among the plurality of buffer means, and then the digital audio data stored on the selected buffer means is further transferred to the selected audio input/output means.

According to another aspect of the present invention, a recording and reproducing system is constructed using memory means of a large capacity.

More specifically, there is provided a recording and reproducing system which comprises:

memory means of a large capacity for storing audio data;

buffer means accessible for a high speed read/write operation, for exchanging data with the memory means of a large capacity;

audio input/output means for exchanging data with the buffer means to perform an input/output operation of audio data;

leading audio data memory means for storing prior to a reproducing operation a leading audio data which is a leading portion of audio data stored in the memory means; and control means for reading out and supplying the audio input/output means with the leading audio data stored in the heading memory means in response to a command for reproduction of the audio data, and then reading out and supplying the audio input/output means with the audio data which is successively supplied from the memory means and temporarily stored in the buffer means, whereby the leading audio data and the audio data are audibly output.

According to yet another aspect of the present invention, there is provided a recording and reproducing apparatus which comprises:

an external memory medium accessible for a low speed reading operation, for storing digital audio data;

leading data memory means accessible for a high speed reading operation, for previously storing prior to a reproducing operation leading data which is a leading portion of the digital audio data stored on the external memory medium;

first reading means for reading out the leading data from leading data memory means in accordance with a command for reading out the digital audio data from the external memory medium;

buffer means accessible for a high speed reading operation, for exchanging the digital audio data with the external memory medium;

data transfer means for transferring the digital audio data following the leading data to the buffer means while the first reading means is reading out the leading data; and second reading means for reading out the digital audio data from the buffer means after the first reading means has read out the leading data.

In the above arrangement, a disk memory device such as the hard disk and the magneto-optical disk is suitable for the above external memory medium. As the leading data memory means and the buffer means may be employed a semi-conductor memory or more specifically a random access memory (RAM).

It would be apparent for those skilled in the art from the following description of preferred embodiments that the present invention may be modified in various different manners as well as applied to other cases.

BRIEF DESCRIPTION OF THE DRAWINGS

Other objects and structures of the present invention will be more fully understood by those skilled in the art from the following description of the preferred embodiments and the accompanying drawings.

FIG. 9 is an access data table; and

DETAILED DESCRIPTION OF THE PREFERRED EMBODIMENTS

Figure 1:
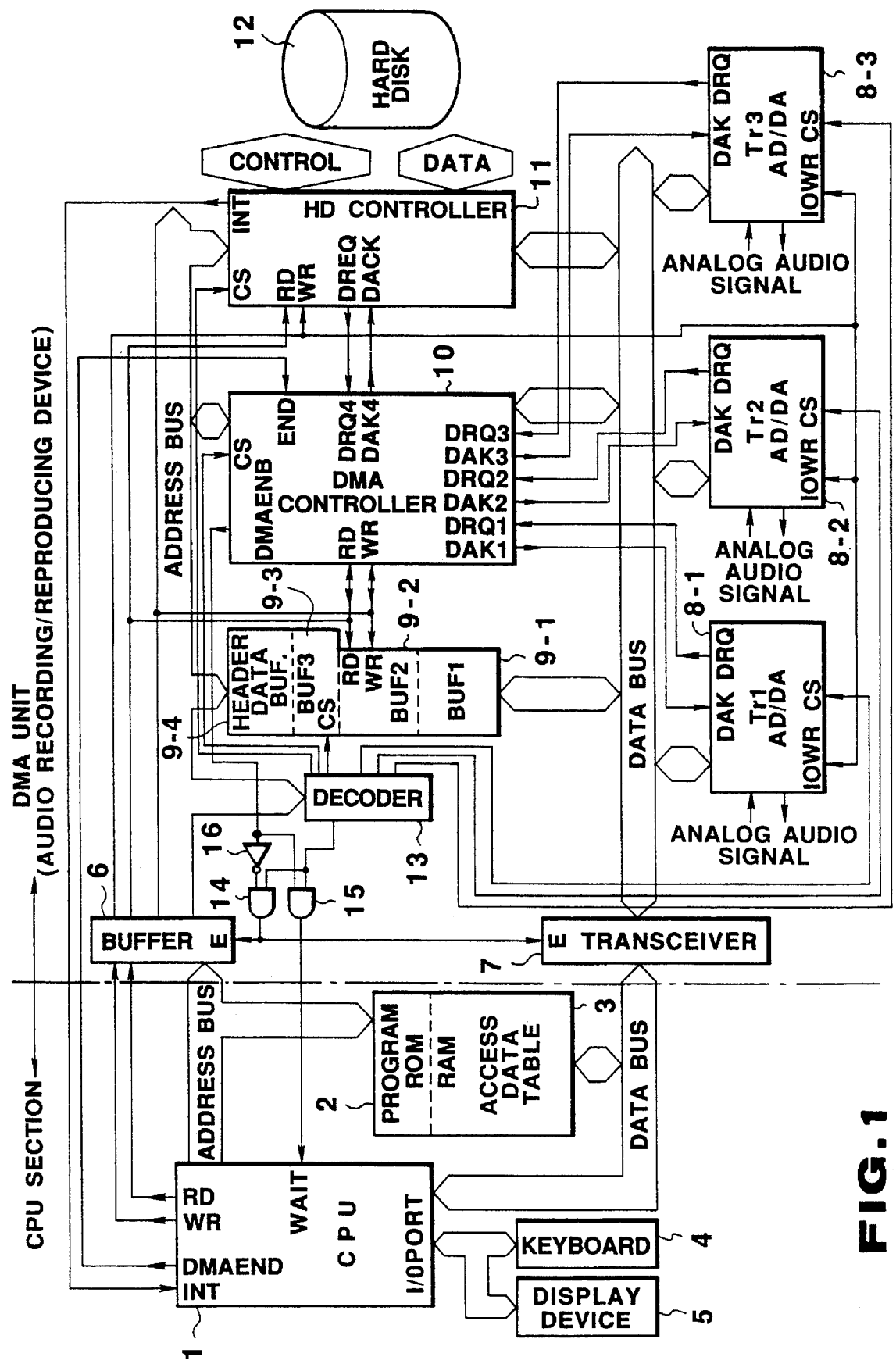
FIG. 1 is a block diagram showing the structure of an embodiment of a digital recorder according to the present invention.

Preferred embodiments of the digital recorder according to the present invention will be described referring to the drawings.

General Structure

FIG. 1 is a view showing the general structure of the embodiment of the digital recorder according to the present invention, which is designed to be able to execute a recording and/or reproducing operation with respect to up to three tracks at the same time. The structure is divided into a CPU section (a left side portion in FIG. 1) and a DMA unit (audio recording and reproducing processor, a right side portion in FIG. 1), as shown in FIG. 1.

The CPU section comprises a CPU 1, a program ROM 2 which stores a program (to be described in detail later) for specifying operation of the CPU 1, a RAM 3, which includes an area for storing various data, an area for storing a current pointer of three tracks, an access data table and a work area, a keyboard 4, which is connected as a peripheral device to an I/O port of the CPU 1 and has various function keys and data input keys, and a display device 5, which includes a cathode ray tube (CRT) or a liquid crystal display (LCD) and its driver to provide various displays. When the audio data stored on a hard disk 12 is manually or automatically sectioned into a plurality of sectional audio data (hereafter referred to as "event"), event identifying index data (Event Nos.), addresses of locations where the events are stored and addresses of headers of the events are stored in the above access data table. The current pointer comprises type data (M or D) designating the memory means (a header data buffer memory 9-4 to be described later or the hard disk 12) and data designating the address of the memory means. That is, the current pointer serves as a disk access pointer as well as a header-data buffer-memory access pointer. As will be described later, in the real time operation such as in the recording/reproducing operation, the CPU 1 controls individual components in the DMA unit as needed while an address bus and a data bus in the DMA unit are not busy. In editing an audio signal, the CPU 1 rearranges data blocks and manipulates the disk access pointer. Setting a record/play mode for each track (hereafter referred to as Tr), starting and stopping the mode, locating the track, designation of an editing function such as designation, insertion and deletion of an editing point, and designation of a sound volume curve can be effected using the keyboard 4, as will be described later.

An address signal is sent from the CPU 1 through an address bus to the address terminals of the program ROM 2 and RAM 3, which have their output terminals connected through a data bus to the CPU 1 or a transceiver 7.

A buffer 6 and the transceiver 7 are provided in the DMA unit to connect the CPU section to the DMA unit. The buffer 6 is connected through an address bus to the CPU 1, and is connected to an address bus in the DMA unit. The transceiver 7 is connected through the data bus to the CPU 1, and is also connected through a data bus in the DMA unit.

Provided in the DMA unit are an audio input/output device 8-1 for Tr 1, an audio input/output device 8-2 for Tr 2, and an audio input/output device 8-3 for Tr 3, which will independently receive or output an analog audio signal.

The audio input/output devices 8-1 to 8-3 each include a converter for selectively executing A/D or D/A conversion, a low pass filter for eliminating sampling noises and a clock circuit for generating a clock signal of a sampling cycle. When the mentioned tracks for the respective audio input/output devices 8-1 to 8-3 are set in record mode, each audio input/output device samples an externally supplied analog audio signal at the sampling cycle, and performs A/D conversion on the sampled signal to obtain digital audio data. When these tracks are set in play mode, the digital audio data which has been read out in advance is subjected to D/A conversion at the sampling cycle, and is then properly filtered, and is output as an analog audio signal.

The audio input/output devices 8-1 to 8-3 for the respective Tr 1 to Tr 3 are connected through the data bus to buffers 9-1 (BUF1), 9-2 (BUF2) and 9-3 (BUF3) respectively, exchanging digital audio data therewith.

The buffers 9-1 to 9-3 correspond to Tr 1 to Tr 3 respectively and exchange data respectively with the audio input/output devices 8-1 to 8-3 through direct memory accessing (DMA) under control of DMA controller 10. Data in the header data buffer memory or leading portion audio data buffer memory 9-4 is sectioned in association with the number of events previously registered therein such that the sectioned data store a plurality of events respectively, and are transferred to any one of audio input/output devices 8-1 to 8-3 through DMA.

The buffers 9-1, 9-2 and 9-3, and the header data buffer memory 9-4 are provided in one and the same RAM as shown in FIG. 1. The header data buffer memory 9-4 is connected through the data bus and the transceiver 7 to the CPU 1, and serves to store an audio data header which comprises a leading portion of the event designated by the CPU 1.

In record mode, the audio input/output devices 8-1, 8-2 and 8-3 request the DMA controller 10 for DMA transfer (single transfer) of digital data in association with one sampling from the audio input/output devices 8-1 to 8-3 to the buffers 9-1 to 9-3 at the sampling cycle. That is, the audio input/output devices 8-1 to 8-3 send DRQ signals (signal DRQ1 for Tr 1, DRQ2 for Tr 2 and DRQ3 for Tr 3) to the DMA controller 10, and then the DMA controller 10 sends back acknowledgement signals (signal DAK1 for Tr 1, DAK2 for TR 2 and DAK3 for Tr 3) to the devices 8-1, 8-2 and 8-3, executing actually the data transfer.

In play mode, the audio input/output devices 8-1 to 8-3 request the DMA transfer (single transfer) of the digital data in association with one sampling at the sampling cycle from the buffers 9-1 to 9-3 to the audio input/output devices 8-1 to 8-3 or from the header-data buffer memory 9-4 to the audio input/output devices 8-1 to 8-3. Then the data transfer is executed by the DMA controller 10 as described above.

The buffers 9-1 to 9-3 comprise memory areas in RAM which are prepared for Tr 1 to Tr 3 respectively, and each have a memory capacity sufficient for storing digital audio data for multiple times, and these buffers are arranged to function as FIFO buffers, when they are used as ring buffers (a buffer whose last address and first address are imaginarily linked together).

The header data buffer memory 9-4 comprises a memory area which is provided in the same RAM as the buffers 9-1 to 9-3 and has a memory capacity sufficient for storing header data of audio data for multiple times. The header-data buffer memory 9-4 is provided for storing header data of the events previously registered.

The buffers 9-1 to 9-3 and the header data buffer memory 9-4 are addressed through the bus by the DMA controller 10.

The address bus, the data bus and a control signal line within the DMA unit are occupied by the DMA controller 10 while the DMA transfer is being executed.

The buffers 9-1 to 9-3 and the header data buffer memory 9-4 exchange data with the hard disk 12 through the data bus under control of a hard disk controller (hereafter referred to as HD controller) 11 (the header data buffer memory 9-4 only receives data from the hard disk 12). The hard disk 12 and the HD controller 11 are connected to each other through the data bus and the control signal line. The hard disk 12 is accessed for a read/write operation under control of the HD controller 11. The hard disk 12 has three separate memory areas for three tracks Tr 1 to Tr 3. Data transfer between the buffers 9-1 to 9-3 and the header data buffer memory 9-4 is executed under control of the DMA controller 10. The DMA controller 10 serves to execute the data transfer by sending an interrupt signal (INT) to the CPU 1 after the HD controller 11 has transferred one block data, and sending a command for transferring the following data. Upon receiving the interrupt signal (INT) from the HD controller 11, the CPU 1 sets the DMA controller 10 and the HD controller 11 to the desired mode or effect programming thereof, and then allows the controllers to perform the DMA transfer. A detailed description of this operation will be given later.

For designating an event prior to a reproducing operation, the DMA controller 10 reads out a predetermined amount of header data (header data for multiple sampling cycles) from the hard disk 12 and transfers to the header data buffer memory 9-4. In play mode, the DMA controller 10 transfers the data from the buffer 9-4 to the audio input/output devices 8-1 to 8-3 for Tr 1 to Tr 3. Furthermore, reading out a predetermined amount (data for multiple sampling cycles) of digital audio data from the hard disk 12, the DMA controller 10 executes DMA transfer (block transfer) of data to the designated buffer among the buffers 9-1 to 9-3. Thereafter, the DMA controller 10 repeats these operations. In record mode, the DMA controller 10 repeatedly reads out a predetermined amount (data for multiple sampling cycles) of digital audio data from the designated buffer other than the header data buffer memory 9-4, and executes DMA transfer (block transfer) of data to a designated location on the hard disk 12.

For exchanging data between the hard disk 12 and the buffers 9-1 to 9-3 and 9-4, the HD controller 11 sends a request signal DREQ to the DMA controller 10 (the DMA controller 10 receives the request signal as DRQ4), and the DMA controller 10 sends back a response signal DACK or DAK4 to the HD controller 11, when the data transfer is made ready.

As described above, the DMA controller 10 executes data transfer on four channels in the time sharing manner: data transfer on three channels (CH1 to CH3 to be described later) between the audio input/output devices 8-1 to 8-3 for Tr 1 to Tr 3 and the buffers 9-1 to 9-3 or between the audio input/output devices 8-1 to 8-3 for Tr 1 to Tr 3 and the header data buffer memory 9-4, and data transfer on one channel (CH4 to be described later) between the hard disk 12 and any one of buffers 9-1 to 9-3, which is selected sequentially. In event designating mode, the channel CH4 is also used to transfer the header data of the designated event from the hard disk 12.

The CPU 1 supplies an address signal to the buffer 6 through the address bus for controlling the functions and operations of components within the DMA unit. The CPU 1 also supplies designating signals for designating the components through the buffer 6 to a decoder, then sending the designating signals CS to the audio input/output devices 8-1 to 8-3, the buffers 9-1 to 9-3, the header data buffer memory 9-4, the DMA controller and the HD controller 11. At the same time, the CPU 1 exchanges various data with these circuits via the data bus through the transceiver 7.

Further, CPU 1 supplies a designating signal WR, which designates if the audio input/output devices 8-1 to 8-3 should be set to the record mode (write mode) or the play mode (read mode), to the IOWR terminals of respective audio input/output devices 8-1 to 8-3 through the buffer 6. The CPU 1 also sends through the buffer 6 the designating signal WR (write signal) and another designating signal RD (read signal) to the buffers 9-1 to 9-3, the header data buffer memory 9-4, the DMA controller 10 and the HD controller 11, to read out data from and write data in the respective components. The DMA controller 10 also outputs these signals RD and WR in DMA transfer mode. The relationship between these signals and the functions and operations of the components will be described later.

The DMA controller 10 sets a DMA enabling signal DMAEND to "1" and outputs it, while the DMA transfer is executed between the components within the DMA unit. When the signal DMAENB is sent to an AND gate 14 through the invertor 16, the output of the gate 14 becomes "0". Then the enabling signal E is supplied as "0" to the buffer 6 and the transceiver 7 to disable the CPU section and the DMA unit to exchange data and address with each other. When a signal of "1" is sent to an AND gate 15 from the decoder 13 in this case, the output of the gate 15 becomes "1", allowing a wait signal WAIT to be supplied to the CPU 1.

If the DMA transfer starts while the CPU 1 supplies the decoder 13 with a predetermined signal to enable the buffer 6 and the transceiver 7 in order to control the DMA unit, i.e., while the decoder supplies the signal of "1" to one of the input terminals of the AND gate 14 (when the CPU 1 outputs the address signal to access one of the buffers 9-1 to 9-3, the header data buffer memory 9-4, the DMA controller 10, the HD controller 11 and the audio input/output devices 8-1 to 8-3, the output of the decoder 13 becomes active, sending the signal of "1" to one input terminal of each of the AND gates 14 and 15), the CPU 1 receives the wait signal WAIT, allowing the DMA transfer to be performed by priority over other operations. After the DMA transfer is completed, the CPU 1 is released from WAIT, starting the operation again.

Even if the CPU 1 tries to access the DMA controller 10 while the DMA controller 10 is executing the DMA transfer, the wait signal WAIT is supplied from the AND gate 15 to the CPU 1, and the execution cycle of the CPU 1 is made longer to disable the buffer 6 and the transceiver 7 during this period.

In short, the CPU 1 is allowed to access the components within the DMA unit under the following conditions:

(1) when the CPU 1 outputs an address to access the individual components within the DMA unit, and (2) when the signal DMAEND is inactive ("0") or the data bus in the DMA unit is not busy.

The CPU 1, however, is allowed to continue processing by action of the AND gates 14 and 15 without considering when to access the DMA unit.

To change the operating state of the DMA controller 10 immediately in accordance with a key input or the triggering by the control data, the CPU 1 can output a command DMAEND to the DMA controller 10 to interrupt the DMA transfer whatever state the DMA controller 10 is in (the command is sent as an END signal to the DMA controller 10).

Structure of Essential Portions of DMA Controller 10

One example of the structure of the DMA controller 10 will now be explained. The DMA controller can transfer in one bus cycle of several hundred nanoseconds. Therefore, it will take one to two microseconds to transfer the sampling for three tracks.

With the sampling frequency fs of 48 KHz, the interval of one sampling period is approximately 21 microseconds. It is possible to assign most of the sampling time interval to the time for transferring data among the buffers 9-1 to 9-3, the HD controller 11 and the hard disk 12, and the time for the CPU 1 to program the individual components.

Figure 2:
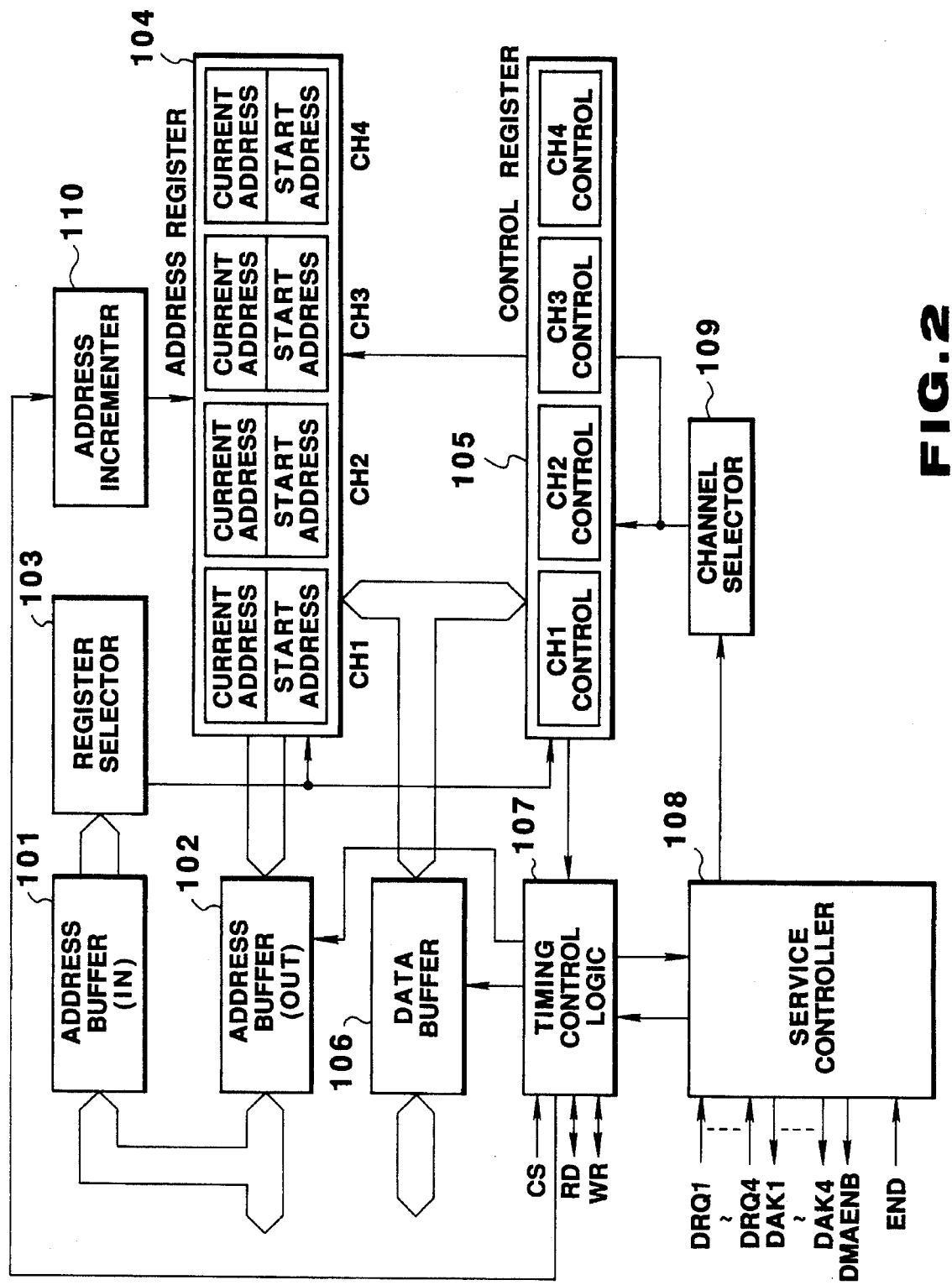
FIG. 2 is a block diagram showing the structure of an embodiment of a direct memory access (hereafter referred to as DMA) controller of FIG. 1.

The structure of the essential portions of the embodiment is shown in FIG. 2. The DMA controller 10 has an address buffer 101 on the input side (IN) to be connected to the address bus and an address buffer 102 on the output side (OUT). According to the address signal sent to the address buffer 101 on the input side, what is designated by a register selector 103 is changed to designate desired registers present in an address register 104 and a control register 105.

The address register 104 and the control register 105 each are provided with four channels CH1 to CH4; the channels CH1 to CH3 are registers for DMA transfer between the buffers 9-1 to 9-3 and the audio input/output devices 8-1 to 8-3, and between the header data buffer memory 9-4 and the audio input/output devices 8-1 to 8-3, and the channel CH4 is a register for DMA transfer between a designated buffer among the buffers 9-1 to 9-3 and the header data buffer memory 9-4 and the hard disk 12.

The registers for the channels CH1 to CH4 in the address register 104 each have an area for storing at least current addresses and start addresses of the corresponding buffer 9-1, 9-2 or 9-3 (or area corresponding to Tr1, Tr2 or Tr3 in the header buffer memory 9-4) and the designated buffer. The individual areas for the channels CH1 to CH4 in the control register 105 store control data to designating the direction of DMA transfer.

The contents of the address register 104 and the control register 105 can be input from and output to the data bus through the data buffer 106. A timing control logic circuit 107, a service controller 108 and a channel selector 109 control these components.

The service controller 108 is of a hard logic type or micro-program controlled type. The controller 108 receives a signal from a timing control logic 107, DMA request signals DRQ1 to DRQ4 from the audio input/output devices 8-1 to 8-3 and the HD controller 11 and a DMA end command (DMAEND) from the CPU 1, and outputs acknowledge signals DAK1 to DAK4 to the components and the DMA enabling signal DMAENB indicating that the DMA transfer is being executed. Further, the controller 108 outputs various commands to the timing control logic 107 and a channel selecting signal to the channel selector 109. The channel selector 109 selectively specifies registers corresponding to the individual channels CH1 to CH4 in the control register 105.

The timing control logic 107 receives a designating signal CS from the decoder 13, a control signal from the control register 105 and a control signal from the service controller 108, controlling the input and output of the address buffer 102 and the data buffer 106. Further, the logic 107 enables an address incrementer to increase the current address of the designated channel in the address register 104.

Whole Operation of CPU 1

Now, the operation of the embodiment will be described hereafter. Flow charts of the operation of the CPU 1 are shown in FIGS. 3 to 6. The CPU 1 operates in accordance with a program (softwear) stored in the program ROM 2.

Figure 3:
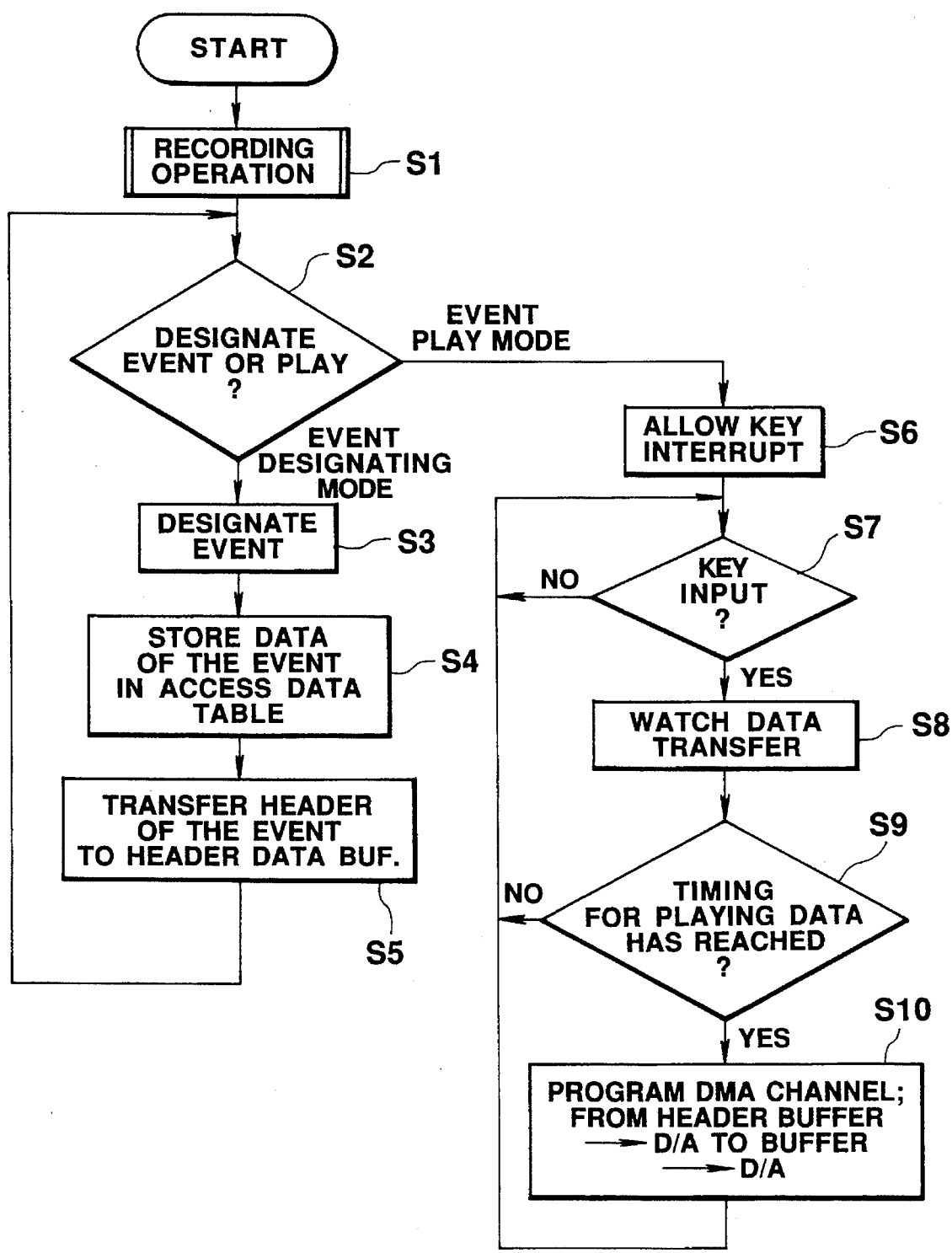
FIG. 3 is a flowchart showing the main routine operation of a central processing unit (hereafter referred to as CPU) of FIG. 1.
Figure 4:
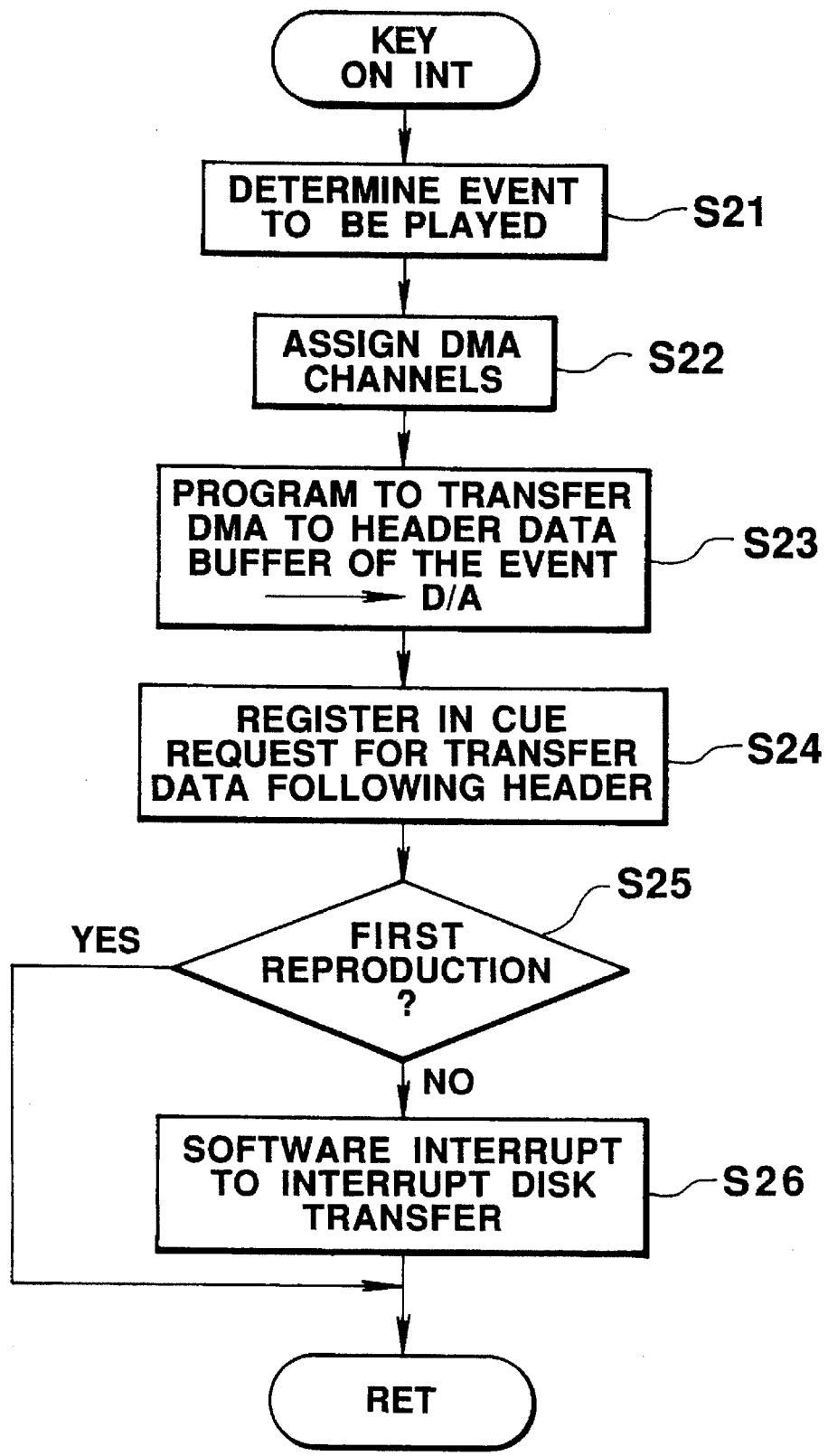
FIG. 4 is a flowchart showing the interrupt routine operation of the CPU of FIG. 1.
Figure 5:
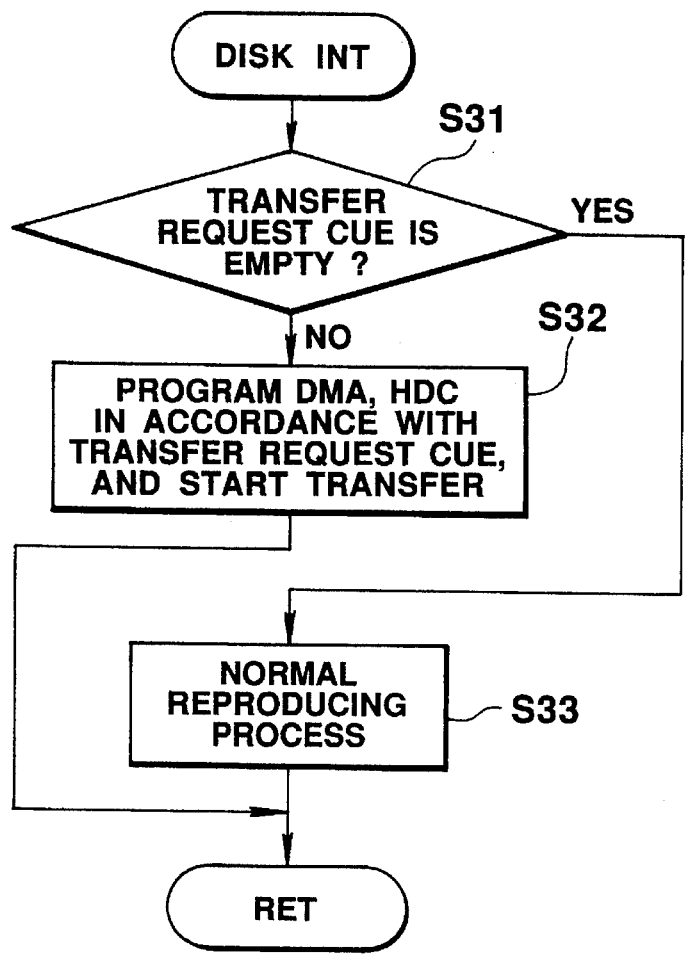
FIG. 5 is a flowchart showing the interrupt routine operation of the CPU of FIG. 1 executed at completion of a disk transfer operation.
Figure 6:
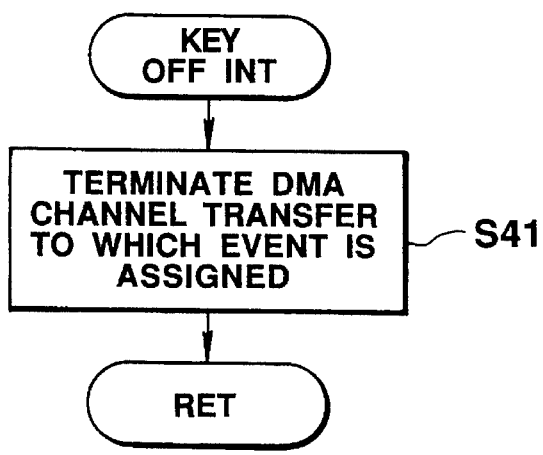
FIG. 6 is a flowchart showing a key-off interrupt routine operation of the CPU of FIG. 1.

FIG. 3 is a flow chart of the main routine operation of CPU 1, and FIGS. 4 to 6 are flow charts showing the interrupt routine operation performed by CPU 1 when it receives the interrupt signal INT from the HD controller 11.

In FIG. 3, the recording operation is executed at step S1, i.e., the audio input/output devices 8-1 to 8-3 perform A/D conversion on the input audio signal at the sampling cycle. The A/D converted signal is input to the buffers 9-1 to 9-3 to be temporarily stored therein. The block transfer of the data which are stored in the buffers 9-1 to 9-3 is performed to the hard disk 12 to be stored therein under control of the DMA controller 10 and the HD controller 11.

Figure 7:
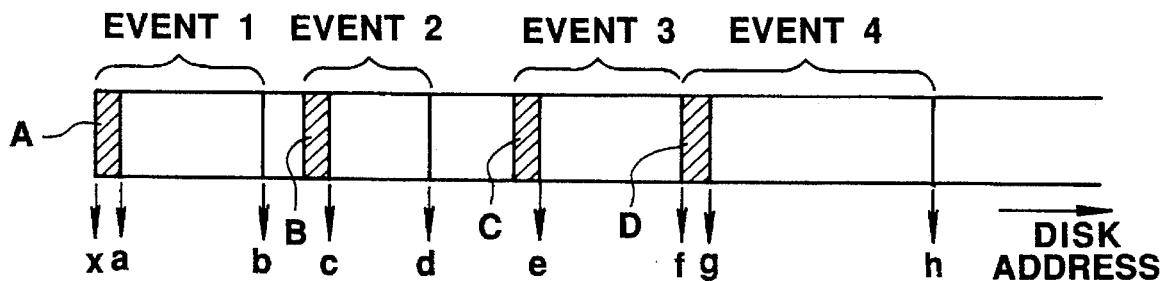
FIG. 7 is a view showing a stored state on a hard disk.

Judging at step S2 that an event designating mode has been selected by operation of the keyboard 4 after completion of the recording operation, the CPU 1 designates an event at step S3. In other words, for example, the CPU 1 designates as the event 1 the audio data stored at addresses X to b on the hard disk 12 as shown in FIG. 7. When the CPU 1 has designated the event in this manner, data concerning the event such as the address of the event are stored in the access data table in the RAM 3 at step S4. At step S5, the DMA transfer of the leading portion (header) HA of the event 1 is performed, for example, through the channel CH4 of the DMA controller 10 to the header data buffer memory 9-4, and the transferred data is stored at addresses 0 to 4 FFF on the buffer memory 9-4. Thereafter, the events 2, 3 and 4 are similarly designated by the CPU 1 and the data concerning these events are stored in the access data table of the RAM 3 and the header data buffer memory 9-4.

Figure 8:
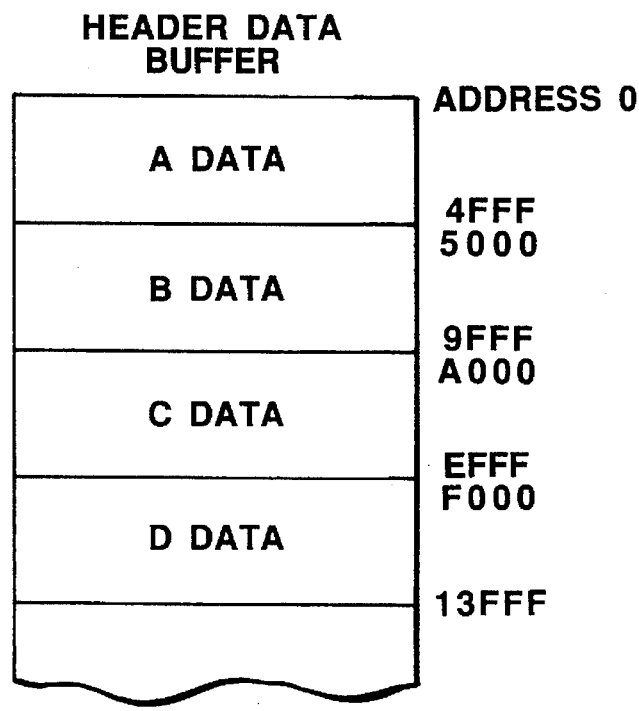
FIG. 8 is a view showing a stored state on a header-data buffer-memory.

FIG. 8 is a view schematically showing a data recorded state on the header buffer memory 9-4, where the header data of the events 1 to 4 are stored in specified areas, respectively.

FIG. 9 is a view schematically showing a data stored state on the access data table, where event numbers, addresses of the top and the end of the header of each event stored on the header data buffer memory 9-4, and the addresses of the top and the end of the audio data which follows each header and is stored on the hard disk 12 are stored respectively.

When the CPU 1 receives a command to set play mode for a predetermined event through operation of the keyboard 4 after completion of the event designating operation, a processing for allowing an interrupt of the key input is performed at step S6. In other words, an interrupt processing through the keyboard 4 is made. At step S7, a mode is set for waiting for an event play triggering. In the meantime, while the CPU 1 receives no command for setting play mode, the CPU 1 remains in a waiting mode at step S7. When the CPU 1 detects a key input, the CPU 1 goes to interrupt routine operations shown in FIGS. 4 to 6. These operations performed by CPU 1 will be described in detail later.

In the main routine operation, when a command for start of playing the predetermined event is issued, the header data is read out from the above header data buffer memory 9-4. When the CPU 1 watches the header data transfer at step S8, and judges at step S9 that a timing has reached for playing the audio data following the header (address of the header data has reached the last one), the CPU 1 goes to the operation at step S10, where the memory which the data is to be read out from is switched from the header data buffer memory 9-4 to the buffers 9-1 to 9-3. More specifically, when a command is issued for playing No.1 event, a header A stored at addresses 0 to 4 FFF in the header data buffer memory 9-4 is read out and supplied to any one of the audio input/output devices 8-1 to 8-3 (for example, to the audio input/output device). The audio input/output devices 8-1 to 8-3 perform D/A conversion on the received header data, and output the data to a circuit (not shown). While all the header data are read out, predetermined amounts of data among the audio data (audio data following the header A) stored at addresses a to b are input to and written into any one (for example, the buffer 9-1) of the buffers 9-1 to 9-3. When all the headers have been read out, the memory which is to supply data to the audio input/output devices 8-1 to 8-3 is switched from the header data buffer memory 9-4 to the buffers 9-1 to 9-3, whereby audio data stored at the address a and the following addresses are subjected to D/A conversion and are output.

When a predetermined key input is effected at step S7 in the main routine operation, the CPU 1 goes to a key-on interrupt routine shown in FIG. 4. At step S21, in event to be reproduced is determined an accordance with operation of the keyboard 4. Then, CPU 1 assigns DMA channels to the determined event at step S22. That is, when the events of Nos.1 to 3 are designated, the CPU 1 assigns the channels CH1 to CH3 to these events, respectively. In this case, up to three events in association with key inputs can be reproduced at the same time, but when more than three events are designated, the designation of the event is ignored since all the channels are busy and there is no channel to be assigned for the fourth event. After completion of the assignment of the channels, the CPU 1 programs the DMA controller 10 at step S23 such that the header data of the events stored on the header data buffer memory 9-4 are transferred to the audio input/output devices 8-1 to 8-3. Then, the data transfer is executed.

The audio data following the header data must have been transferred from the hard disk 12 to the buffers 9-1 to 9-3 while the header data are transferred. Therefore, the CPU 1 makes a transfer request (specifying how much data should be transferred from the hard disk to the buffers, and from which addresses on the hard disk to which addresses on which buffers). This transfer request is registered to a transfer access request for searching a leading portion i.e., a transfer request cue. If the event is reproduced for the first time following a silent state, the hard disk is not yet in operation so that the CPU 1 by no means enters into a disk transfer end interrupt routine of FIG. 5 to be described later (operations of this routine are performed every completion of data transfer from the hard disk). Therefore, when the HD controller 11 judges at step S25 that the reproduction of the event is performed for the first time after the silent state, the HD controller 11 issues a software interrupt to the CPU 1 at step S26 to read out the disk end interrupt routine of FIG. 5. When an event is designated while another event is reproduced, the process at step S26 is skipped, since the operations in the disk transfer end routine of FIG. 5 are performed upon completion of the data transfer from the hard disk 12.

The disk transfer end interrupt routine will now be explained referring to FIG. 5. It is judged at step S31 if the transfer request cue is empty. When a request for searching another header has been issued (when the transfer request cue is not empty), the CPU 1 goes to step S32, where the CPU 1 programs the DMA controller 10 and the HD controller 11 in accordance with the transfer request indicated in the cue which is made at step S24 of FIG. 4. Then, the transfer of the audio data following the headers starts. When the transfer request cue is empty, the CPU 1 advances to step S33, where processes are executed for reproducing the present event in a normal manner, since another event is not reproduced. That is, the processes for assigning appropriately data blocks from the hard disk 12 to the buffers 9-1 to 9-3 in the time sharing manner are executed in association with the individual channels which are sounding at present.

When a key off command is issued, a key off interrupt routine is performed to terminate all the DMA channel transfer to which the present event has been assigned. As a result, the reproduction of the event is stopped at step S41.

Assuming that data capacity stored in the header data buffer memory 9-4 amounts to PCM data of 48 KHz 16 bits for approximately 60 microseconds, an over head time for accesses (=60 microseconds) of three times can be absorbed, when three events are simultaneously reproduced with the hard disk 12 having an access time of 20 microseconds.

Figure 10:
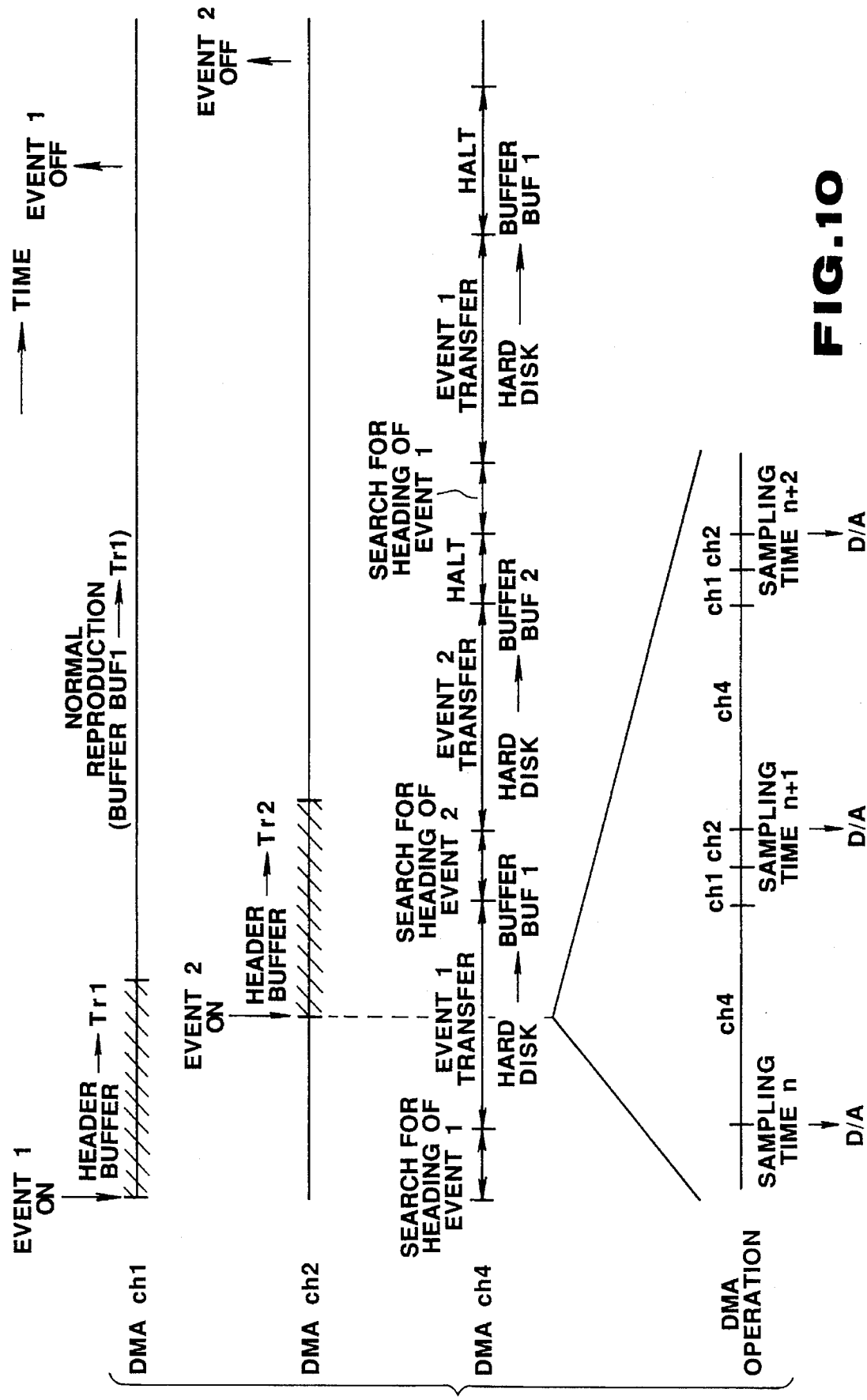
FIG. 10 is a timing chart for the operation of the embodiment of FIG. 1.

FIG. 10 is a time chart illustrating the above operations. When, for instance, a command is issued for reproducing the event 1 in the channel CH1 of the DMA controller 10, the header HA of the event 1 is transferred from the header data buffer memory 9-4 to the audio input/output device 8-1 (Tr1). After the header A has been transferred, data stored in the buffer 9-1 is supplied to the audio input/output device 8-1. Similarly, when the reproduction of the event 2 is instructed in the channel CH2, the header B of the event 2 is transferred from the header data buffer memory 9-4 to the audio input/output device 8-2. After the header B has been transferred, data stored in the buffer 9-2 is supplied to the audio input/output device 8-2.

Now, attention is given to the channel CH4 of the DMA controller 10. The heading of the event 1 is searched on the hard disk 12, and then audio data following the header A of the event 1 is transferred from the hard disk 12 to the buffer 9-1. Further, the heading of the event 2 is searched on the hard disk 12, and then audio data following the header B of the event 2 is transferred from the hard disk 12 to the buffer 9-2. Thereafter, the above operations are appropriately repeated. Explaining the DMA transfer operation further in detail, the operations of the channels CH1 and CH2 are performed during the individual sampling periods, respectively. During a time period other than the above sampling periods, the data transfer is executed between the hard disk 12 of the channel CH4 and the buffers 9-1 and 9-2.

In the above embodiment, the header data is stored in the header data buffer memory, but sounds which are output after the key is turned off may be stored in an end data buffer memory. In the arrangement including the end data buffer memory, header data is read out from the header data buffer memory at first, data is then reproduced from the hard disk, and sounds which are output after an event designating key is turned off are finally read out from the end data buffer memory. With this arrangement, a sampler device can be realized which needs no loop in the program for saving memory, and is capable of playing sampling data of a long sound without any modification.

As described above, in the digital recorder according to the present invention, the headers of the audio data are stored in the header memory means prior to the reproducing operation so that, in play mode, the headers are read out in advance, and in the meantime the audio data are transferred from the external memory medium means to the audio data memory means and are reproduced, whereby the reproducing operation of the audio data can be performed immediately.

Although the several embodiments of the present invention have been described in detail, these embodiments are simply illustrative and not restrictive. The present invention may therefore be modified in various manners. All the modifications and applications of the present invention are within the scope and spirit of the invention, so that the scope thereof should be determined only by what is recited in the appended claims and their equivalents.

What is claimed is:

1. A digital recorder comprising:
   external memory medium means for storing digital audio data corresponding to a digitized version of an analog signal representing a tone;

reading control means coupled to said external memory medium means for reading out the digital audio data from said external memory medium means, including reading out a leading portion audio data;

leading portion audio data semiconductor memory means for storing the leading portion audio data prior to a tone reproducing operation, the leading portion audio data being a leading portion of the digital audio data stored in said external memory medium means;

audio data memory means for temporarily storing the digital audio data following the leading portion audio data, said digital audio data being read out and successively supplied from said external memory medium means to said audio data memory means by said reading control means;

audio output means for outputting an audio signal to produce a tone; and control means coupled to said leading portion audio data semiconductor memory means, to said audio data memory means and to said audio output means, for:

reading out and outputting the leading portion audio data stored in said leading portion audio data semiconductor memory means to said audio output means in response to a command for reproducing the digital audio data, to output an audio signal based on said digital audio data of said leading portion audio data, and then reading out and outputting the digital audio data to said audio output means which have been successively transferred from said external memory medium means to said audio data memory means to be temporarily stored therein by said reading control means.

2. A digital recorder according to claim 1, wherein said external memory medium means stores a plurality of digital audio data, and said leading portion audio data memory means stores leading portion audio data each being the leading portion for each of the plurality of digital audio data stored in said external memory medium means.

3. A digital recorder according to claim 2, wherein said digital recorder further comprises a specifying means for specifying one of the plurality of digital audio data to be reproduced, and when one of the plurality of digital audio data is specified to be reproduced by said specifying means, said control means firstly reads out the leading portion audio data of the specified digital audio data stored in said leading portion audio data memory means, and then reads out the digital audio data following the read out leading portion audio data, which digital audio data have been successively transferred by said reading control means from said external memory medium means to said audio data memory means to be temporarily stored therein.

4. A digital recorder according to claim 1, wherein said external memory medium means comprises a disk memory medium which allows a random accessing.

5. A digital recorder comprising:

audio input/output means for executing an input/output operation of audio data in association with multiple tracks;

buffer means capable of exchanging digital audio data with said input/output means with respect to individual tracks of said multiple tracks, and also capable of temporarily storing the digital audio data in association With the individual tracks, said digital audio data corresponding to a digitized version of an analog signal representing a tone;

external memory means of a random access type, capable of exchanging the digital audio data with said buffer means, said external memory means having a memory area which is accessible for a read/write operation of the digital audio data for the multiple tracks;

leading portion audio data semiconductor memory means for storing a leading portion audio data prior to a tone reproducing operation, the leading portion audio data being a leading portion of the digital audio data stored in said external memory means, said leading portion audio data semiconductor memory means being capable of exchanging leading portion audio data with said input/output means;

data transfer means for executing transfer of the digital audio data for each track between said audio input/output means and said buffer means, and between said audio input/output means and said leading portion audio data semiconductor memory means, and executing transfer of the digital audio data for each track between said buffer means and said external memory means, in a time sharing manner in accordance with a predetermined order of priority for respective data transfer; and control means for controlling said data transfer means in response to a command for reproducing the digital audio data to read out and transfer the leading portion audio data stored in said leading portion audio data semiconductor memory means to said audio input/output means, to output an audio signal based on said digital audio data of said leading portion audio data, and successively to transfer the digital audio data following the thus transferred leading portion audio data from said external memory means to said buffer means to store therein, and further to transfer the digital audio data stored in said buffer means to said audio input/output means.

6. A digital recorder according to claim 5, wherein said external memory means stores a plurality of digital audio data, and said leading portion audio data memory means stores a plurality of leading portion audio data each being the leading portion of each of the digital audio data.

7. A digital recording according to claim 6, wherein said digital recorder further comprises a specifying means for specifying one of the plurality of digital audio data to be reproduced, and when one of the plurality of digital audio data is specified to be reproduced by said specifying means, said control means controls said data transfer means to read out and transfer the leading portion audio data of the specified digital audio data from said leading portion audio data memory means to said audio input/output means, and further to read out and transfer the digital audio data following the read out leading portion audio data from said buffer means to said audio input/output means, said digital audio data being successively transferred from said external memory means to said buffer means to be temporarily stored therein.

8. A digital recorder according to claim 5, wherein said external memory means comprises a disk memory medium which allows a random accessing.

9. A digital recorder according to claim 5, wherein said data transfer means executes transfer of the digital audio data for each track at a rate corresponding to a sampling cycle between said audio input/output means and said buffer means, and between said audio input/output means and said leading portion audio data memory means.

10. A digital recorder according to claim 5, wherein said audio input/output means has request means which makes a request to said data transfer means at a rate corresponding to a sampling frequency of the digital audio data for executing transfer of the digital audio data between said audio input/output means and said buffer means, and between said audio input/output means and said leading portion audio data memory means, and said data transfer means executes a single transfer of the digital audio data in one sampling period in response to the request made by said request means.

11. A digital recorder according to claim 5, wherein said external memory means has request means which sequentially makes requests to said data transfer means for executing transfer of the digital audio data concerning the track in operation between said external memory means and said buffer means, and said data transfer means executes a block transfer of the digital audio data of multiple sampling periods between said external memory means and said buffer means in response to the requests made by said request means.

12. A digital recorder comprising:

a plurality of audio input/output means provided in association with a plurality of tracks respectively, for selectively executing analog/digital conversion and digital/analog conversion;

a plurality of buffer means capable of exchanging digital audio data with the plurality of audio input/output means respectively, and also capable of storing temporarily the digital audio data for each of the plurality of tracks, said digital audio data corresponding to a digitized version of an analog signal representing a tone;

external memory means of a random access type, capable of exchanging the digital audio data with the plurality of buffer means, and having a memory area for the plurality of tracks which is accessible for a read/write operation of the digital audio data;

leading portion audio data semiconductor memory means for storing a leading portion audio data prior to a tone reproducing operation, the leading portion audio data being a leading portion of the digital audio data stored in said external memory means, said leading portion audio data semiconductor memory means being capable of exchanging leading portion audio data with said input/output means;

data transfer means for executing transfer of the digital audio data between said plurality of audio input/output means and said plurality of buffer means, and between said plurality of audio input/output means and said leading portion audio data semiconductor memory means, and transfer of the digital audio data between said plurality of buffer means and said external memory means, in a time sharing manner in accordance with a predetermined order of priority for respective data transfers; and control means for controlling said data transfer means in response to a command for reproducing the digital audio data to read out and transfer the leading portion audio data stored in said leading portion audio data semiconductor memory means to the audio input/output means selected from among the plurality of audio input/output means, to output an audio signal based on said digital audio data of said leading portion audio data, and successively to transfer the digital audio data following the thus transferred leading portion audio data from said external memory means to the buffer means selected from among said plurality of buffer means to store therein, and further to transfer the digital audio data stored in said selected buffer means to said selected audio input/out means.

13. A digital recorder according to claim 12, wherein said external memory means stores a plurality of digital audio data, and said leading portion audio data memory means stores a plurality of leading portion audio data each comprised of the leading portion of the digital audio data.

14. A digital recorder to claim 12, wherein said digital recorder further comprises a specifying means for specifying one of the plurality of digital audio data to be reproduced; and when one of the plurality of digital audio data is specified to be reproduced by said specifying means, said control means controls said data transfer means to read out and transfer the leading portion audio data of the specified digital audio data stored in said leading portion audio data memory means to the audio input/output means selected from among the plurality of audio input/output means, and further to read out and transfer the digital audio data following the transferred leading portion audio data to said selected audio input/output means, which digital audio data have been successively transferred from said external memory means to said selected buffer means to be temporarily stored therein.

15. A digital recorder according to claim 12, wherein said external memory means comprises a disk memory medium which allows a random accessing.

16. A digital recorder according to claim 12, wherein said plurality of audio input/output means each have request means which makes a request to said data transfer means at a rate corresponding to a sampling frequency of the digital audio data for executing transfer of the digital audio data between said audio input/output means and the corresponding buffer means among said plurality of buffer means, and between said audio input/output means and said leading portion audio data memory means, and said data transfer means executes a single transfer of the digital audio data of one sampling period in response to the request made by said request means.

17. A digital recorder according to claim 12, wherein said external memory means has request means which sequentially makes requests to said data transfer means for executing transfer of the digital audio data for the track in operation between said external memory means and said plurality of buffer means, and said data transfer means executes a block transfer of the digital audio data of multiple sampling periods between said external memory means and a specified buffer means among said plurality of buffer means in response to the request made by said request means.

18. A digital recorder according to claim 12, wherein when said data transfer means is requested for executing transfer of the digital audio data by both said plurality of audio input/output means and said external memory means, the data transfer means executes transfer of the digital audio data between one of the plurality of audio input/output means and the buffer means corresponding thereto prior to transfer of the digital audio data between said buffer means and said external memory means.

19. A recording and reproducing system comprising:

memory means of a large memory capacity for storing audio data;

buffer means accessible for a high speed read/write operation for exchanging data with said memory means of a large memory capacity;

audio input/output means for exchanging data with said buffer means and executing an input/output operation of the audio data;

leading portion audio data semiconductor memory means for storing a leading portion audio data prior to a tone reproducing operation, the leading portion audio data representing audio signal data digitally and being the leading portion of the audio data, said digital audio data corresponding to a digitized version of an analog signal representing a tone;

control means coupled to said buffer means, to said audio input/output means and to said leading data memory means, for:

reading out and supplying the leading portion audio data stored in said leading portion audio data semiconductor memory means to said audio input/output means to provide an audible output corresponding to the audio signal based on said digital audio data of said leading portion audio data, and then reading out the audio data which has been supplied from said memory means to said buffer means to be stored therein and further supplying the read out audio data to said audio input/output means to provide an audible output.

20. A recording and reproducing system according to claim 19, wherein said audio input/output means executes the input/output operation at a rate corresponding to a sampling frequency.

21. A recording and reproducing apparatus comprising:

external memory medium means accessible for a low-speed read operation, for storing digital audio data corresponding to a digitized version of an analog signal representing a tone;

leading portion audio data semiconductor memory means accessible for a high-speed read operation, for previously storing a leading portion audio data prior to a tone reproducing operation, the leading portion audio data being the leading portion of the digital audio data stored in said external memory medium means;

first reading means coupled to said leading portion audio data semiconductor memory means for reading out the leading portion audio data from said leading portion audio data semiconductor memory means when the digital audio data is requested to be read out;

buffer means accessible for a high-speed read/write operation, coupled to said external memory medium means for exchanging the digital audio data with said external memory medium means;

data transfer means coupled to said external memory medium means and to said buffer means for transferring the digital audio data following the leading portion audio data from said external memory medium means to said buffer means while said first reading means reads out the leading portion audio data; and second reading means coupled to said first reading means and to said buffer means, for reading out the digital audio data from said buffer means after said first reading means has read out the leading portion audio data from said leading portion audio data semiconductor memory means.

* * * * *